(12) United States Patent
Schleicher

(10) Patent No.: US 7,734,544 B2
(45) Date of Patent: Jun. 8, 2010

(54) AUTHORIZATION AND CAPTURE WITH MULTIPLE CURRENCIES

(75) Inventor: Joerg Schleicher, San Francisco, CA (US)

(73) Assignee: eBay Inc., San Jose, CA (US)

( * ) Notice: Subject to any disclaimer, the term of this patent is extended or adjusted under 35 U.S.C. 154(b) by 322 days.

(21) Appl. No.: 11/376,848

(22) Filed: Mar. 16, 2006

(65) Prior Publication Data

US 2006/0229977 A1 Oct. 12, 2006

Related U.S. Application Data

(63) Continuation-in-part of application No. 11/102,056, filed on Apr. 8, 2005.

(51) Int. Cl.
*G06Q 40/00* (2006.01)

(52) U.S. Cl. .......................................... 705/40; 705/39

(58) Field of Classification Search .................... 705/40
See application file for complete search history.

(56) References Cited

U.S. PATENT DOCUMENTS

| | | | |
|---|---|---|---|
| 6,038,552 A | 3/2000 | Fleischl et al. | |
| 6,324,525 B1 | 11/2001 | Kramer et al. | |
| 6,601,033 B1 | 7/2003 | Sowinski | |
| 6,892,184 B1 * | 5/2005 | Komem et al. ................ | 705/26 |
| 6,999,943 B1 * | 2/2006 | Johnson et al. ............... | 705/39 |
| 7,383,223 B1 * | 6/2008 | Dilip et al. .................... | 705/39 |
| 2002/0099656 A1 * | 7/2002 | Poh Wong .................... | 705/40 |
| 2002/0128917 A1 | 9/2002 | Grounds | |
| 2002/0133412 A1 | 9/2002 | Oliver et al. | |
| 2003/0208440 A1 * | 11/2003 | Harada et al. ................. | 705/39 |
| 2004/0049452 A1 | 3/2004 | Blagg | |
| 2004/0073509 A1 | 4/2004 | Haddad | |
| 2004/0167854 A1 * | 8/2004 | Knowles et al. ............... | 705/41 |
| 2004/0210531 A1 | 10/2004 | Barron et al. | |
| 2005/0177447 A1 | 8/2005 | Napier et al. | |
| 2006/0235758 A1 | 10/2006 | Schleicher | |

FOREIGN PATENT DOCUMENTS

| | | |
|---|---|---|
| EP | 949596 A2 * | 10/1999 |
| WO | WO-2006110525 A2 | 10/2006 |
| WO | WO-2006110525 A3 | 10/2006 |

OTHER PUBLICATIONS

U.S. Appl. No. 11/102,056, Non-Final Office Action mailed on Dec. 23, 2008, 11 pgs.

(Continued)

*Primary Examiner*—Calvin L Hewitt, II
*Assistant Examiner*—Zeshan Qayyum
(74) *Attorney, Agent, or Firm*—Schwegman, Lundberg & Woessner, P.A.

(57) ABSTRACT

Techniques are presented for authorization and capture with multiple funding sources and currencies. A transaction amount associated with a target currency is authorized from one or more funding sources, where at least one of the one or more funding sources includes funds associated with a different currency from the target currency. The funds from the different currency are calculated at authorization to cover the transaction amount and converted at settlement or capture to determine if the transaction amount is still covered at capture.

23 Claims, 7 Drawing Sheets

OTHER PUBLICATIONS

U.S. Appl. No. 11/102,056, Response filed Mar. 23, 2009 to Non Final Office Action mailed Dec. 23, 2008, 9 pgs.

U.S. Appl. No. 11/102,056, Final Office Action mailed Jun. 19, 2009, 11 pgs.

U.S. Appl. No. 11/102,056, Pre-Appeal Brief Request filed Sep. 21, 2009, 5 pgs.

U.S. Appl. No. 11/102,056, Response filed Aug. 19, 2009 to Final Office Action mailed Jun. 19, 2009, 9 pgs.

U.S. Appl. No. 11/376,848, Advisory Action mailed Dec. 31, 2008, 13 pgs.

* cited by examiner

AUTHORIZATION AND CAPTURE WITH MULTIPLE CURRENCIES

RELATED APPLICATIONS

The present invention claims priority to and is a Continuation-In-Part of a co-pending and a commonly assigned application having a U.S. Ser. No. of 11/102,056 entitled "Authorization Techniques," filed on Apr. 8, 2005; the disclosure of which is incorporated by reference herein.

FIELD

The invention relates generally to transaction processing and more particularly to techniques for automated and real-time authorization and capture with multiple currencies.

BACKGROUND

The electronic marketplace is increasingly becoming a global enterprise. That is, buyers and sellers may exist anywhere in the world for any given transaction. There is a desire to make a particular geographical location of the buyer or seller irrelevant to any given electronic transaction.

However, there are still a variety of practical impediments to seamless international electronic commerce. For example, buyers may often have a variety of different funding sources, such that any given funding source by itself may lack the necessary balance to complete any given transaction. As another example, which is more particularly related to geographic location, a buyer may have funds in a foreign currency that is not accepted or desired by a given seller.

Consider a seller located in the United States that conducts a transaction with a buyer located in Great Britain, the seller may not be capable of processing currency associated with the British Pound and may desire to transact only in United States Dollars. Yet, the buyer may not have any automated mechanism to transact with the seller in dollars. A situation such as this creates a bottleneck in international electronic commerce, since the buyers and sellers may actively avoid one another in this scenario. Thus, the marketplace for each participant to the transaction has been unnecessarily restricted due to governmental and political limitations associated with currency denominations that manifest themselves based on the particular geographical locations of the buyers and the sellers.

One technique that may be deployed to resolve this problem is to use a credit card for purposes of conducting a cross currency transaction. For instance, if a credit card is accepted in both the selling and buying countries, then such a transaction as described above may proceed. The bank associated with the credit card will perform the currency conversion when the funds are transferred or at any other point during a month or billing cycle associated with the credit card that has been agreed to by the parties that accept the credit card.

However, a buyer may not have all the necessary funds on the credit card to complete the transaction. That is, the buyer may have a positive balance in a bank account or other funding source that the buyer desires to use to complete the transaction. If this is the case, then the use of credit card does not alleviate the problem associated with conversion between currencies. It may also be that the seller is not equipped to accept the credit card being supplied by the buyer or, which may be the case more frequently, the seller does not desire to accept a credit card being offered by the seller, since that particular credit card carries undesirable fees to the seller.

Thus, there needs to be more seamless techniques for promoting international electronic commerce that provides for multiple funding sources and a variety of currency options to both the buyers and the sellers. Additionally, from the seller's perspective the processing associated with being capable of accepting a variety of currencies and funding sources should be transparent to the seller, such that the seller becomes an international merchant with little to no additional effort.

SUMMARY

In an embodiment, a transaction is associated with a transaction amount in a target currency. The transaction amount is authorized from one or more funding sources, where at least one funding source includes funds in a different currency from that of the target currency. A backup funding source may be used if projected funds do not cover the transaction amount, and the backup funding source may be in the target currency or any other currency. At capture or settlement, the funds are converted to see if the transaction amount is still covered and a decision is made as to whether to proceed if the transaction amount is not completely covered.

Other features will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements.

DETAILED DESCRIPTION

Methods and systems for automated authorization and currency conversion are described. In the following description, for purposes of explanation, numerous specific details are set forth in order to provide a thorough understanding of embodiments of the invention. It will be evident, however, to one of ordinary skill in the art that other embodiments of the invention may be practiced without these specific details.

Figure 1:
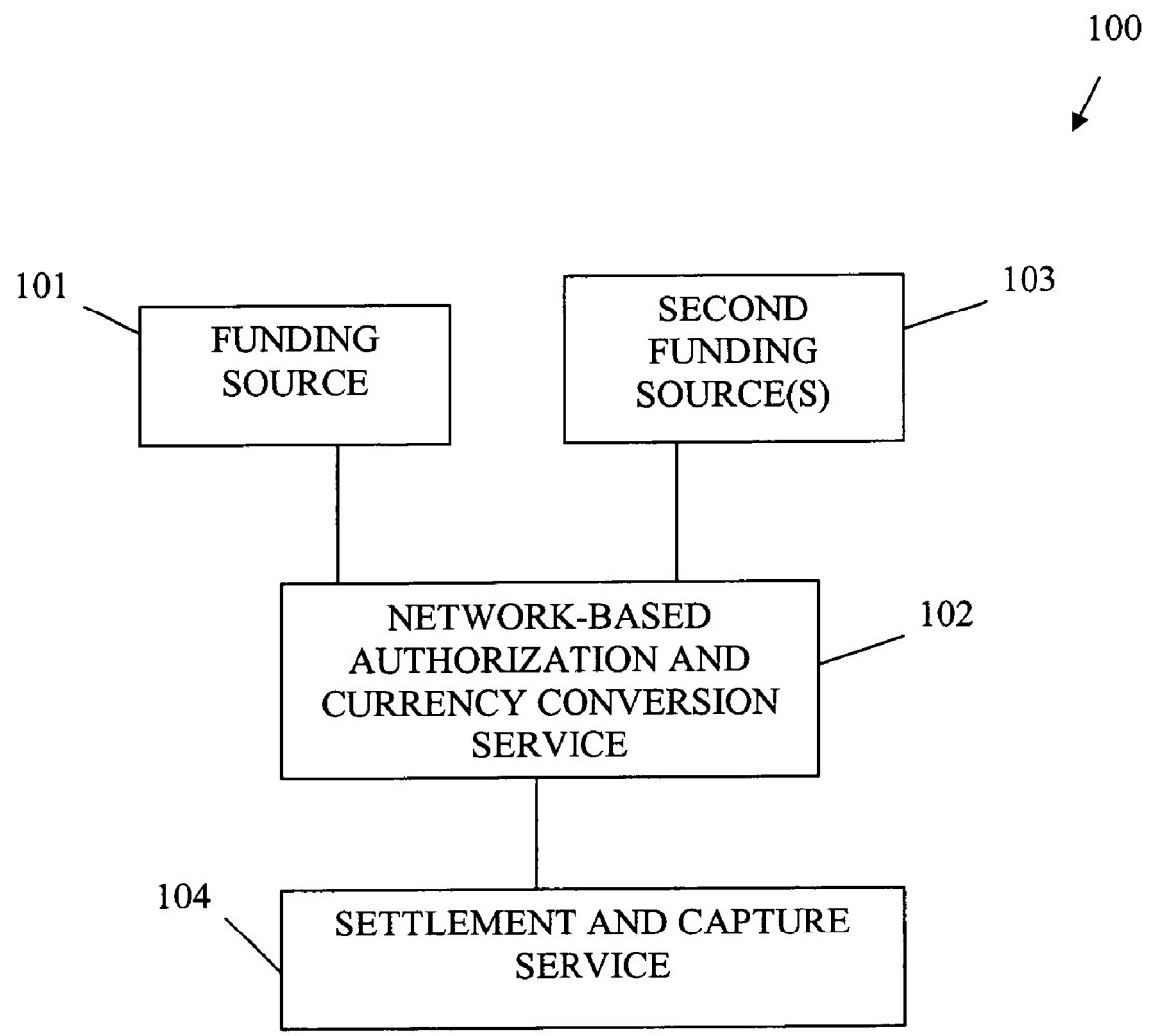
FIG. 1 is a diagram of an authorization and conversion system, according to an example embodiment.

FIG. 1 is a diagram of an authorization and conversion system 100, according to an example embodiment. The authorization and conversion system 100 is implemented in a machine-accessible and/or readable medium and is accessible over a network. The network may be wired, wireless, or a combination of wired and wireless. In an embodiment, the authorization and conversion system 100 is implemented as an authorization and conversion service on a network server over the World-Wide Web (WWW) and is accessible to and interacts with buyers and merchants for purposes of providing automated authorization, conversion, and settlement services to transactions between the merchants and the buyers.

The authorization and conversion system 100 includes a funding source 101 and a network-based authorization and currency conversion service 102. In an embodiment, the authorization and conversion system 100 also includes one or more second funding sources 103 and a settlement and capture service 104. Each of these will now be discussed in turn.

The funding source 101 may be a credit card, a bank account, a positive balance in an online account associated with a merchant or associated with a third-party payment facilitator, such as PayPal® or eBay® of San Jose, Calif. Thus, the funding source 101 may be viewed as an account with a financial institution, an account with a merchant, a gift card, a reward certificate, a debit card, a checking account, and the like. The funding source 101 includes balances in a given currency, such as (United States Dollars, British Pounds, European Euros, Japanese Yen, Australian Dollars, etc.).

The funding source 101 is associated with a buyer of any given online transaction. However, the funding source 101 may be maintained by a merchant, a third-party payment facilitator, or any other financial institution on behalf of or for the benefit of the buyer.

As used herein, the term "merchant" may be used synonymously with the term "seller." So, a merchant is viewed as a seller of a good or service involved in an online transaction. This may be an enterprise or may be an individual. The ability of an individual seller to be viewed as a merchant has been facilitated through the online techniques and revolution associated with PayPal® or eBay® of San Jose, Calif. That is, no longer does each individual seller have to install and use a variety of customized software and services to be able to transact process currency over the Internet or World-Wide Web (WWW), because this processing is handled on behalf of the individual seller by third party payment facilitators or third party financial institutions, such as PayPal® or eBay® of San Jose, Calif.

Similarly, the funding source 101 of the buyer may be handled and processed by third party payment facilitators or third party financial institutions, such as PayPal® or eBay® of San Jose, Calif. In this manner, the buyer and seller are free to dynamic interact with one another over the WWW and switch roles depending upon whether a party to a given transaction is a seller or is a buyer. The accounts and funding source 101 of each is maintained and managed on behalf of the parties in a seamless and convenient manner that is conducive to seamless online commerce.

The funding source 101 includes a currency that is different from a given transaction that is being processed by the authorization and conversion system 100. So, a given seller is expecting or desires to receive a first currency or a transaction currency for the seller's given transaction and the buyer has a second and different currency balance in the funding source 101.

The network-based authorization and currency conversion service 102 is enabled to calculate the funds of the funding source 101 from its native currency to a target or transaction currency for purposes of covering a transaction amount associated with a given transaction occurring between the seller and buyer (at authorization). Initially, the network-based authorization and currency conversion service 102 seeks only to perform authorization on the funds in the funding source 101 but to do this a currency conversion is still processed, since the funds in the funding source 101 are in a different currency from that of the target currency associated with the proposed transaction. The processing at authorization is not an actual conversion rather it is a calculation using a fixed currency rate that exist on the day of authorization.

During authorization, there are not any funds that flow from the buyer and the funding source 100 to the seller and an account associated with the seller; rather, necessary funds to cover the transaction amount associated with the proposed transaction are held or reserved within the first funding source and are unavailable for the buyer to use for other purposes. Essentially, the funds authorized remain in the funding source 101 of the buyer but are not available to the buyer for a predefined period of time. Funds may be re-authorized based on changed circumstances and may be released as well based on changed circumstances, such as an aborted transaction (denied settlement), a transaction not consummated within a predefined period of time dictated by policy, an increase or decrease in price for a good or service associated with the proposed transaction, and the like.

The network-based authorization and currency conversion service 102 acquires a then-existing foreign currency conversion rate for a proposed transaction at the time or day of authorization and calculates a necessary amount of funds available in the funding source 101 from its native currency to the target currency. The calculated amount of needed native currency funds are held within the funding source 101 until either released to the buyer or until a settlement or capture occurs that results in the held amount of currency being transferred from the buyer's funding source 101 to an account or different funding source associated with the seller.

It is noted that during this authorization and currency calculation a variety of situations or scenarios may be encountered. Each of such situations is handled in an automated manner by the network-based authorization and currency conversion service or other optional components of the authorization and conversion system 100.

For example, the desired transaction amount in the target currency may exceed an available balance of funds available in the native currency of the funding source 101. In such a situation, the authorization and conversion system 100 may include one or more second funding sources 103. These are other funding sources 103 available to or identified by the buyer of the transaction to help facilitate the transaction. The network-based authorization and currency conversion service 102 may use up (hold) available funds from the initial funding source 101 during authorization and then resort to the one or more second funding sources 103 to hold or reserve the remaining balance needed to ultimately and subsequently complete the proposed transaction. The one or more second funding sources 103 may include funds having the same currency as the target currency, may include funds having the same currency as the currency of the initial funding source 101, and/or may include funds having entirely different currency from both the target currency and the initial funding source's currency.

So, the network-based authorization and currency conversion service 102 may perform an authorization for a transaction across a plurality of disparate funding sources 101 and 103 each having fund balances with different currencies to accommodate and facilitate a proposed transaction in a target or transaction currency.

In an embodiment, the authorization and conversion system 100 may also include a settlement and capture service 104. The settlement and capture service 104 is used by the authorization and conversion system 100 when a transaction is consummated between the buyer and seller. In this scenario, the reserved or held funds in the funding source 101 and, if applicable, the second funding sources 103 are converted to the target currency of the transaction and transferred to an account or other funding source of the seller. Again, a variety of situations may present themselves during this portion of completing an international electronic and online transaction.

For example, it is very likely that the conversion rates from the various currencies to the target currency have changed by the time the transaction is to be completed or settled. In such a situation, it may be that more funds will be needed from the buyer to complete the transaction at settlement or capture; alternatively, it may be that fewer funds will be needed from the buyer to complete the transaction at settlement or capture. In the latter case, since the seller is not being disadvantaged in any manner by the changed conversion rates, the transaction may proceed, since the seller is receiving what he/she bargained for; it just so happens the buyer benefits because his/her currency is worth more at settlement and therefore the buyer ends up paying less than expected.

However, if the currency rates that exist at settlement or capture are such that the value of the target currency is worth more than the currency associated with the funding source 101 and, if applicable, the second funding sources 103 used during authorization, then the seller is being disadvantaged and may not be receiving the value initially bargained for in the proposed transaction. Here, the settlement and capture service 104 may elect to perform a variety of processing. For example, the transaction may be aborted entirely or settlement denied if it difference in conversion rates exceeds a buyer and seller mutually agreed threshold. Alternatively, any unfavorable amount may trigger or result in a denial of settlement.

The settlement and capture service 104 may also complete the transaction and acquire the additional funds (settle) if they are available within the funding source 101 and, if applicable, the one or more second funding sources 103. This latter scenario again assumes that the buyer is aware of this and agrees to it in advance. Typically, completing a transaction such as this would again be driven by a mutually agreed threshold between the buyer and the seller, since if the buyer's currency is unusually devaluated because of some economic or political catastrophe it is very unlikely that that the buyer would desire to proceed with the transaction without first being re-consulted in the matter.

According to an embodiment, the authorization and conversion system 100 may also be used to collect fees between the parties involved. So, a fee may be acquired to perform the authorization done by the network-based authorization and currency conversion service 102 and/or a fee may be acquired by any settlement and capture service 104. The fees may be accessed to just the seller or in some cases even the buyer.

The authorization and conversion system 100 permits a transaction to proceed in an automated and seamless manner using a plurality of disparate currencies and optionally a plurality of disparate funding sources. A buyer may pay with fund balances in a native currency when the transaction is directed to a different target currency. With this approach a seller or merchant may offer goods and services worldwide without regard to currency restrictions. This greatly opens the marketplace for sellers and even buyers of goods and service whom may now also buy without regard to national boundaries.

Figure 2:
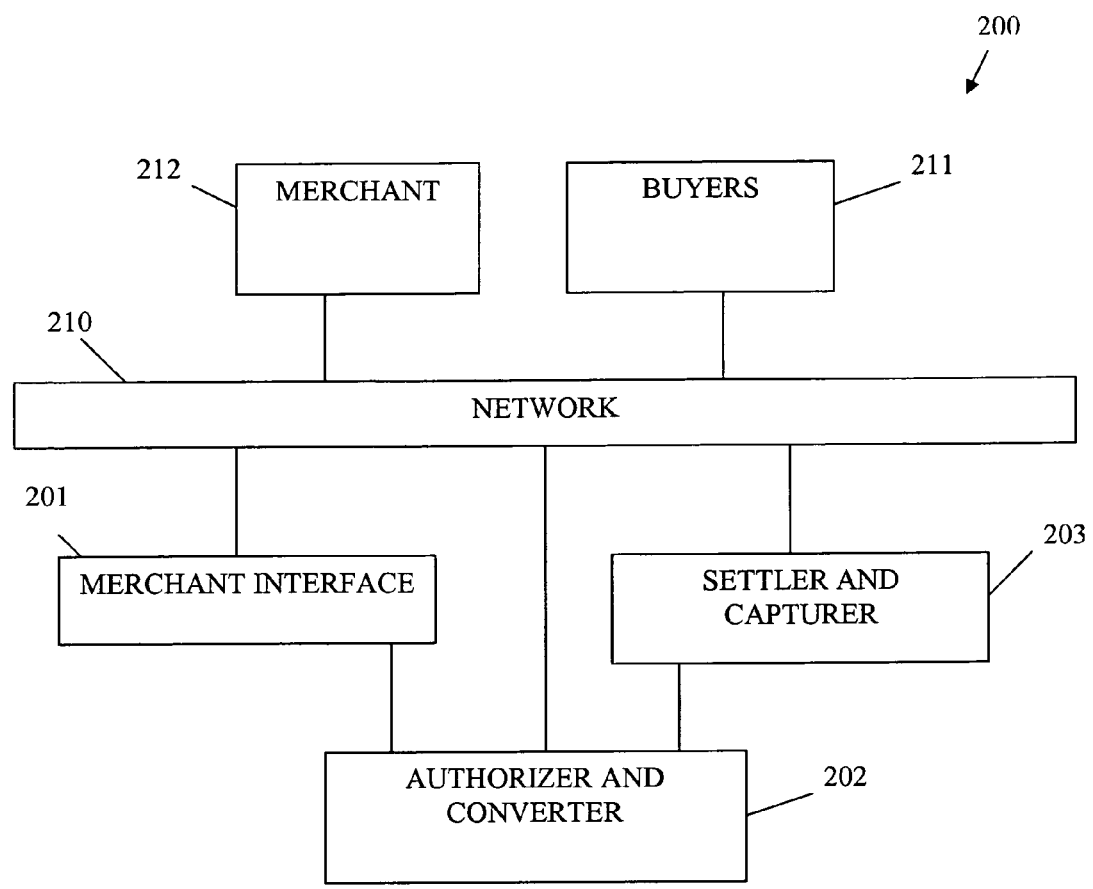
FIG. 2 is a diagram of another authorization and conversion system, according to an example embodiment.

FIG. 2 is a diagram of another authorization and conversion system 200, according to an example embodiment. The authorization and conversion system 200 is implemented in a machine-accessible and/or readable medium and is accessible over a network. The authorization and conversion system 200 presents an alternative arrangement of the authorization and conversion system 100 presented above with respect to FIG. 1.

The authorization and conversion system 200 includes a merchant interface 201 and authorizer and converter 202. The authorization and conversion system 200 may also include a settler or capturer 203. Each of these components 201-203 will now be discussed in turn.

The authorization and conversion system 200 is accessible over a network 210 and interacts or facilitates financial transactions between buyers 211 and merchants 212 (e.g., sellers). The network 210 interaction associated with the buyers 211 and the merchants 212 were discussed above with respect to the authorization and conversion system 100 of FIG. 1.

The merchant interface 201 provides a mechanism for the authorizer and converter 202 to perform authorizations and/or settlements on transactions of the merchant 212 by acquiring parameters associated with any given transaction. That is, the buyer 211 may directly interact with the merchant 212 over the network 210 via interfaces between the two parties 211 and 212, and the merchant 212 uses the merchant interface 201 to offload the authorization and currency calculation as well as perhaps the settlement and ultimate currency conversion. It is noted, that the merchant 212 may also redirect the buyer 211 to the authorizer and converter 202 for processing. In such cases, a buyer interface may also be used (not present in FIG. 2).

The authorizer and converter 202 is implemented as an authorization and currency conversion means within software instructions installed and executed on one or more machines and network enabled. The authorizer and settler means interacts with the merchant interface 201 to acquire authorization for a transaction amount in a target currency from one or more funding sources associated with a buyer 211 of the transaction. Furthermore, at least one of the funding sources used for the authorization includes funds or balances associated with a different currency from the target currency.

According to an embodiment, the authorizer and settler means calculates the funds associated with the different currency that are to be used to funds in the target currency at the time of authorization. During authorization, the authorizer and settler means reserves or places a hold on funds in the funding sources of the buyer 211, which are necessary to ultimately consummate the transaction (settle). However, only currency conversion rates that exist at the time of authorization are available and used for purposes of performing the authorization. Thus, during settlement other techniques or situations are accounted for by the authorization and conversion system 200.

For example, the authorization and conversion system 200 may also include a settler and capturer 203. The settler and capturer 203 is implemented as a settlement and capture means within software instructions that execute on one or more machines. Additionally, the settlement and capture means is enabled and operational over a network 210. The network 210 may be wired, wireless, or a combination of wired and wireless.

According to an embodiment, the settlement and capture means is used to deciding whether to transfer funds from funding sources of the buyer to funding sources or accounts of the merchant 212 when a proposed transaction that was previously authorized by the authorizer and converter 202 is ultimately completed or concluded (settled or captured).

At capture or settlement, the settlement and capture means uses currency rates that exist for the currencies involved at the time of settlement. This may present a shortfall or even an overage for the transaction amount of the transaction in its target currency vis-à-vis the amount held by authorization.

An overage in the native currency may proceed unabated, since this does not present a problem for the merchant 212. A shortfall in the target currency does present a problem for the merchant 212 and may be dealt with using a variety of policies.

For example, a policy may dictate that the settlement and capture means abort a transaction or not process settlement where at settlement a shortfall exceeds a predefined threshold or where the buyer 211 completely lacks funds to cover the shortfall even if the shortfall is below the threshold. In another situation, a policy may drive the settlement and capture means to proceed with acquiring other balances from other funds or backup funding sources of the buyer 211 to cover the shortfall if it is within a predefined threshold.

The settlement and capture means can be configured and driven by policy to dynamically decide whether a transaction may be or should be consummated at capture or settlement time. To do this, the initial transaction amount and its target currency is converted vis-à-vis the one or more native and different currencies associated with funds or balances of one or more funding sources of the buyer 211. A favorable conversion to the merchant 212 should process unabated. So, if the authorization amount covers the transaction amount in the target currency at settlement using settlement conversion rates, the transaction completes (settles) and the settlement and capture means moves funds from the funding sources of the buyer 211 to accounts or funding sources of the merchant 211. If an unfavorable conversion to the merchant 212 is detected the process may proceed or may not proceed. Thus, if the authorization amount does not cover the transaction amount in the target currency at settlement, the transaction may or may not proceed as defined and discussed above (settlement is denied or does not occur).

Figure 3:
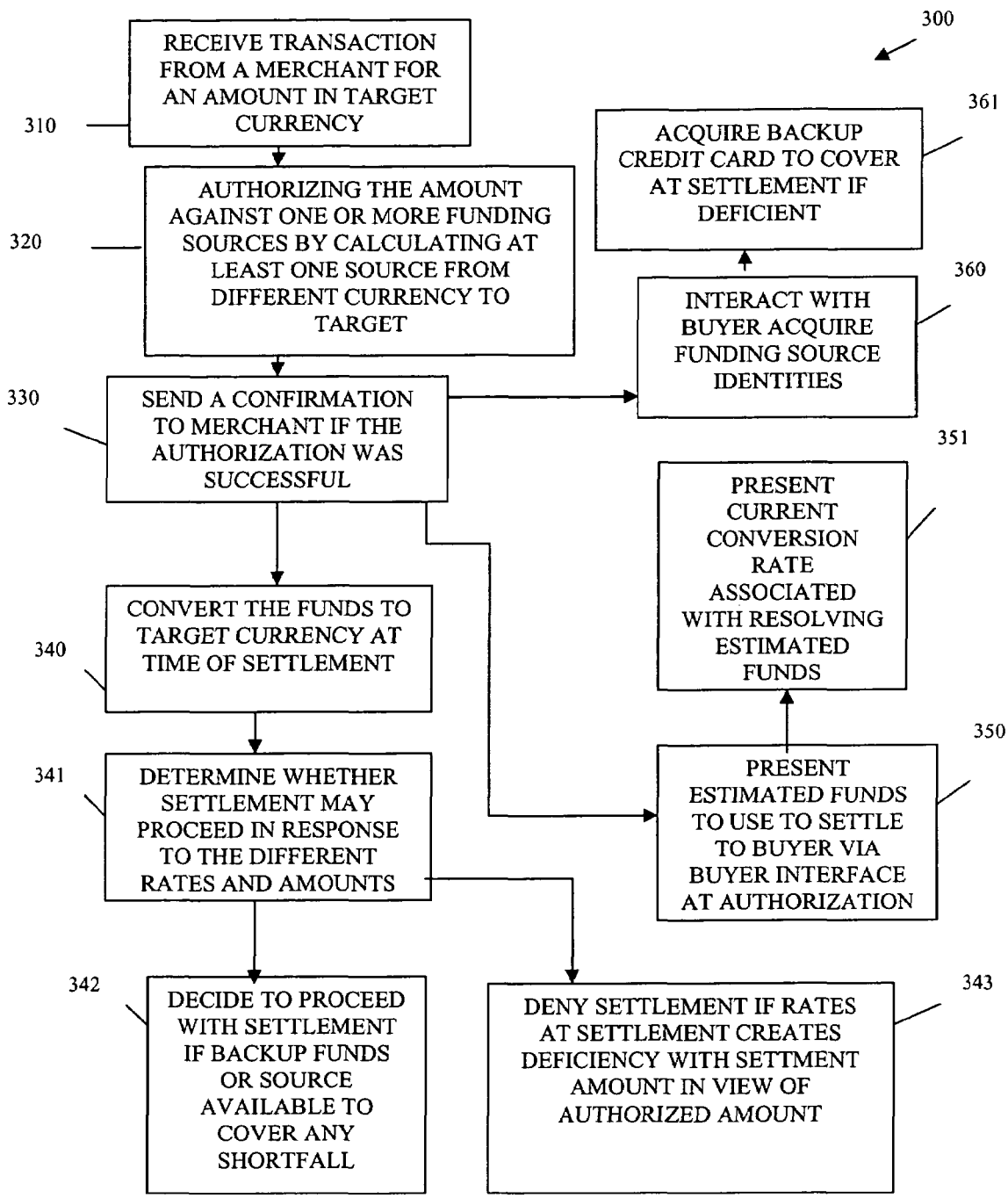
FIG. 3 is a diagram of a method for authorization and currency conversion, according to an example embodiment.

FIG. 3 is a diagram of a method 300 for authorization and currency conversion, according to an example embodiment. The method 300 (herein after "authorization and conversion service") is implemented in a machine-accessible and/or readable medium and is accessible over a network. In an embodiment, the authorization and conversion service may be implemented as the network-based authorization and currency conversion service 102 of FIG. 1 and/or the authorizer and converter means of the authorization and conversion system 200 of FIG. 2.

At 310, the authorization and conversion service receives a transaction from a merchant (e.g., seller) for an amount (transaction amount) in a target currency. So, a seller and buyer engage one another online to process a transaction for a good or service associated with the seller (merchant). However, unlike traditional online transactions this one includes a situation where the buyer has funding sources that are in a different currency then the target currency and may or may not also have a desire to use a variety of different funding sources to complete the transaction.

Accordingly, at 320, the authorization and conversion service authorizes the transaction amount against one or more funding sources of the buyer by calculating funds needed from at least one of the buyer's funding sources using a different currency into the target currency for the transaction. For example, if the target currency is the British Pound and the funding source of the buyer includes funds or balances in the United States Dollar; then a conversion rate at the time of authorization (fixed rate on the date of authorization) of 0.5 may require $2 from the buyer's funding source be held to complete a proposed transaction associated with a transaction amount of 1 British Pound.

It is also noted, that multiple funding sources may be used to authorize the initial transaction. The other funding sources may have the same currency as the target currency, the same currency as the initial funding source (which is different than the target currency, different currencies from the target currency and the initial funding source, or various combinations of the same.

At 330, the authorization and conversion service sends a confirmation to the merchant once it is able to perform the authorization. That is, once the authorization and conversion service has acquired enough calculated or projected funds from the one or more funding sources and set aside or held these funds at a calculated fixed rate at the time (day) of authorization to the target currency, then the authorization and conversion service notifies the merchant that at least at this point the transaction may proceed, since the buyer at present has funds to complete the proposed transaction.

According to an embodiment, at 340, the authorization and conversion service may also perform capture or settlement services for the transaction processing between the merchant and the buyer. So, once a merchant notifies the authorization and conversion service to settle, the authorization and conversion service issues a capture command to transfer funds from the funding sources of the buyer to the merchant and the merchant's funding sources or accounts. To do this, the authorization and conversion service performs a conversion on all the various foreign conversion rates at the time of settlement. It is this conversion that drives the amount that will settle the transaction and not the one identified during authorization. Therefore, at 341, a determination is made as to whether the settlement may actually proceed in response to different foreign monetary conversion rates that existed and were used at authorization and that now exist at settlement. A decision, at 342, may be made by the authorization and conversion service to proceed with the settlement if backup funds or backup sources having additional funds exist with the buyer to cover any shortfall. Alternatively, a decision to deny settlement, at 343, may be made if rates at settlement will create a deficiency in funds initially authorized or that exceed a predefined threshold associated with the merchant. These scenarios were discussed at length above with respect to the authorization and conversion systems 100 and 200 of the FIGS. 1 and 2.

In still another embodiment, at 350, the authorization and conversion service may, at authorization time and/or prior to completing authorization, present to the buyer an estimated amount of funds in the native currency of the buyer's funding source that are needed to at this point in time proceed with the transaction. This may also entail, at 351, presenting to the buyer a current monetary conversion rate for calculating the native currency of the buyer to the target currency of the merchant. This information may prove useful to the buyer, who may decide that the target currency of the merchant is too expensive and thus may be presented with an opportunity at authorization time to back out of the proposed transaction.

In yet another embodiment, at 360, the authorization and conversion service may also interact with the buyer in other manners, such as when the buyer supplies identities for accounts of funding sources to be used with the authorization and, potentially, settlement transaction. It may also be the case, at 361 that during that interaction that the authorization and conversion service requests a backup funding source, such as a credit card, to use in the event that at settlement enough finds are lacking in the initial supplied funding source to cover the consummation of the transaction at capture time.

Figure 4:
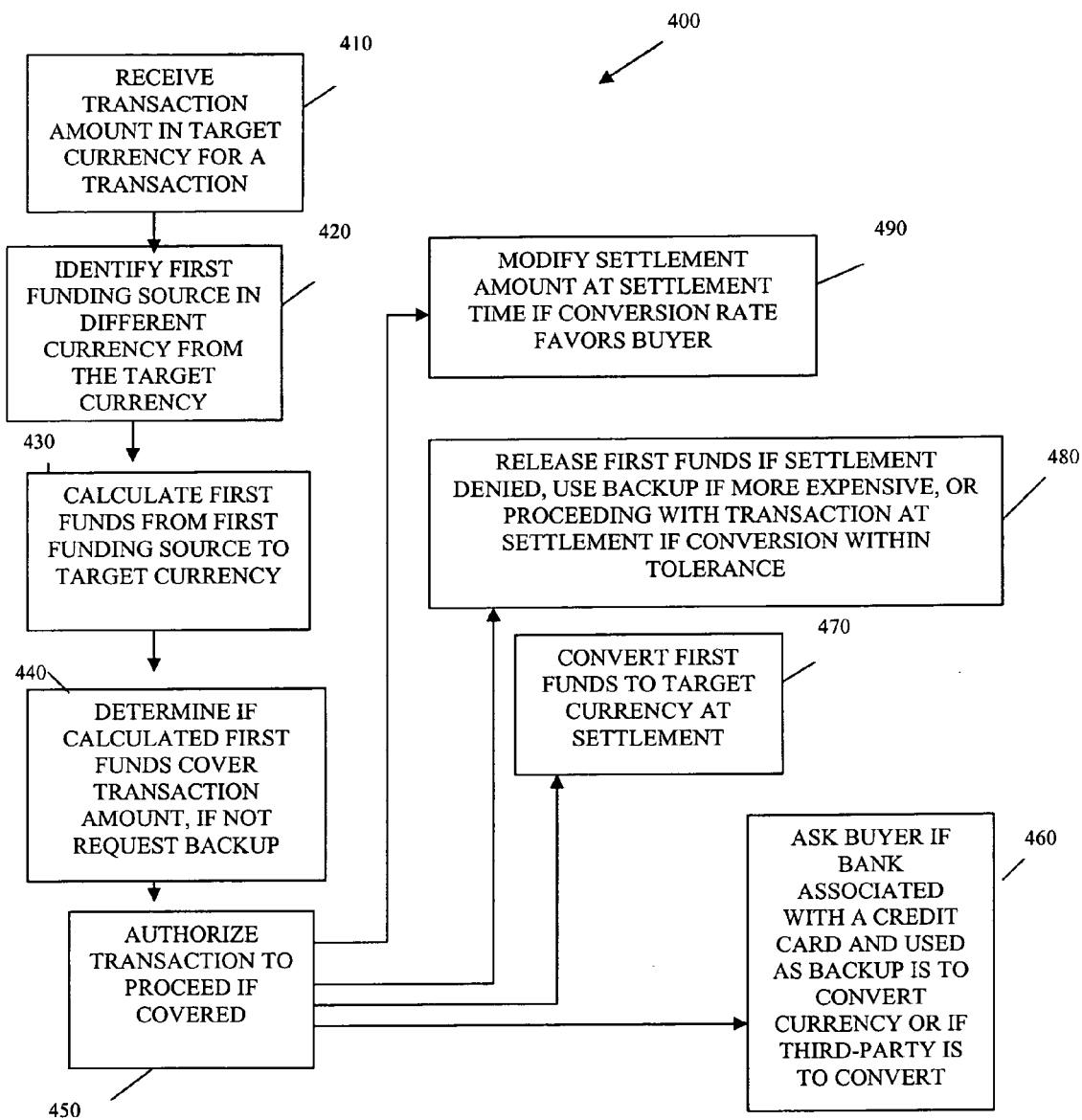
FIG. 4 is a diagram of another method for authorization and currency conversion, according to an example embodiment.

FIG. 4 is a diagram of another method 400 for authorization and currency conversion, according to an example embodiment. The method 400 (hereinafter "authorization service") is implemented in a machine-accessible and/or readable medium and is accessible over a network. The authorization service presents an alternative view of the method 300 represented by the authorization and conversion service of the FIG. 3.

At 410, the authorization service receives a transaction amount for a transaction in a target currency. At 420, the authorization service identifies a first funding source having funds or balances in a different currency from that which is associated with the target currency. At 430, the authorization service calculates the first finds or balances from the first funding source to the target currency using then-prevailing monetary conversion rates, which exist at the time of authorization (day of authorization).

At 440, a determination is then made to decide whether the first funds in the calculated amount cover the proposed transaction amount. If this is in fact the case that there is not enough balance with the first funding source to accommodate the calculated amount, then the authorization service may request that the buyer supply a backup funding source from which the discrepancy may be reserved. A buyer may have a profile that identifies the backup funding source or the buyer may be dynamically questioned to supply one. It may also be the case that more than one backup finding source may exist and a desired order may be communicated via profile or direct interaction with the buyer. So, a buyer may use a plurality of balances from a plurality of finding sources, each having different or same currencies to complete an authorization for a proposed transaction between the buyer and a merchant (seller).

At 450, the authorization service authorizes the transaction to proceed if enough calculated funds are identified and reserved or held to subsequently complete the proposed transaction (settle or capture the proposed transaction). This assumes that enough funds existed, if they did not and if a credit card could not be used to authorize any discrepancy as a backup funding source, then the processing would terminate and the buyer would not be permitted to proceed with the proposed transaction.

In some cases, at 460, the authorization service may even interact with the buyer to ask whether the buyer desires the authorization service or a bank associated with a credit card being used as a funding source to perform the monetary conversion of the funds. Thus, a traditional bank or a third-party service, such as the authorization service may be used to determine the conversion rates.

According to an embodiment, at 470, the authorization service may also be used to actually convert the first funds to the target currency at settlement. This was discussed at length above with respect to the authorization and conversion systems 100 and 200 of the FIGS. 1 and 2 and with respect to the method 300 of the FIG. 3.

In still another embodiment, at 480, the authorization service may decide at settlement to perform a variety of different actions. For example, the transaction may be aborted (settlement denied based on conditions at settlement) thereby releasing the hold on the funds in the buyer's funding sources (set aside at authorization). Alternatively, the authorization service may use a backup funding source, such as a credit card to cover conversion shortfalls at settlement time vis-à-vis rates associated with initial authorization. Still further, if the funds in the initial and first funding source exist to complete the transaction and it difference to consummate the transaction is within a predefined and agreed to tolerance or threshold then the authorization service may proceed with settlement of capture using the initial and first funding source by acquiring some additional and non reserved funds that exists at settlement.

One now fully appreciates how electronic commerce may be internationalized in an automated manner, such that a plurality of currencies and funding sources may be used to authorize and settle transactions. This removes existing obstacles to the electronic marketplace and creates a truly international economy. Moreover, the techniques presented herein provide a framework that permits sellers and buyers to seamless integrate and immediately take advantage of this new international marketplace.

The methods 300 and 400 may be implemented as instructions on machine-accessible media. The instructions are adapted to process the methods 300 and 400 when accessed by a machine. The media may be removable and portable, such that when it is interfaced to a media bay of a machine it is uploaded to the machine, loaded, and processed. Alternatively, the instructions may reside on a remote machine or storage media and be downloaded over a network to a machine and processed. In still other embodiments, the instructions may be prefabricated within the memory and/or storage of a machine.

Figure 5:
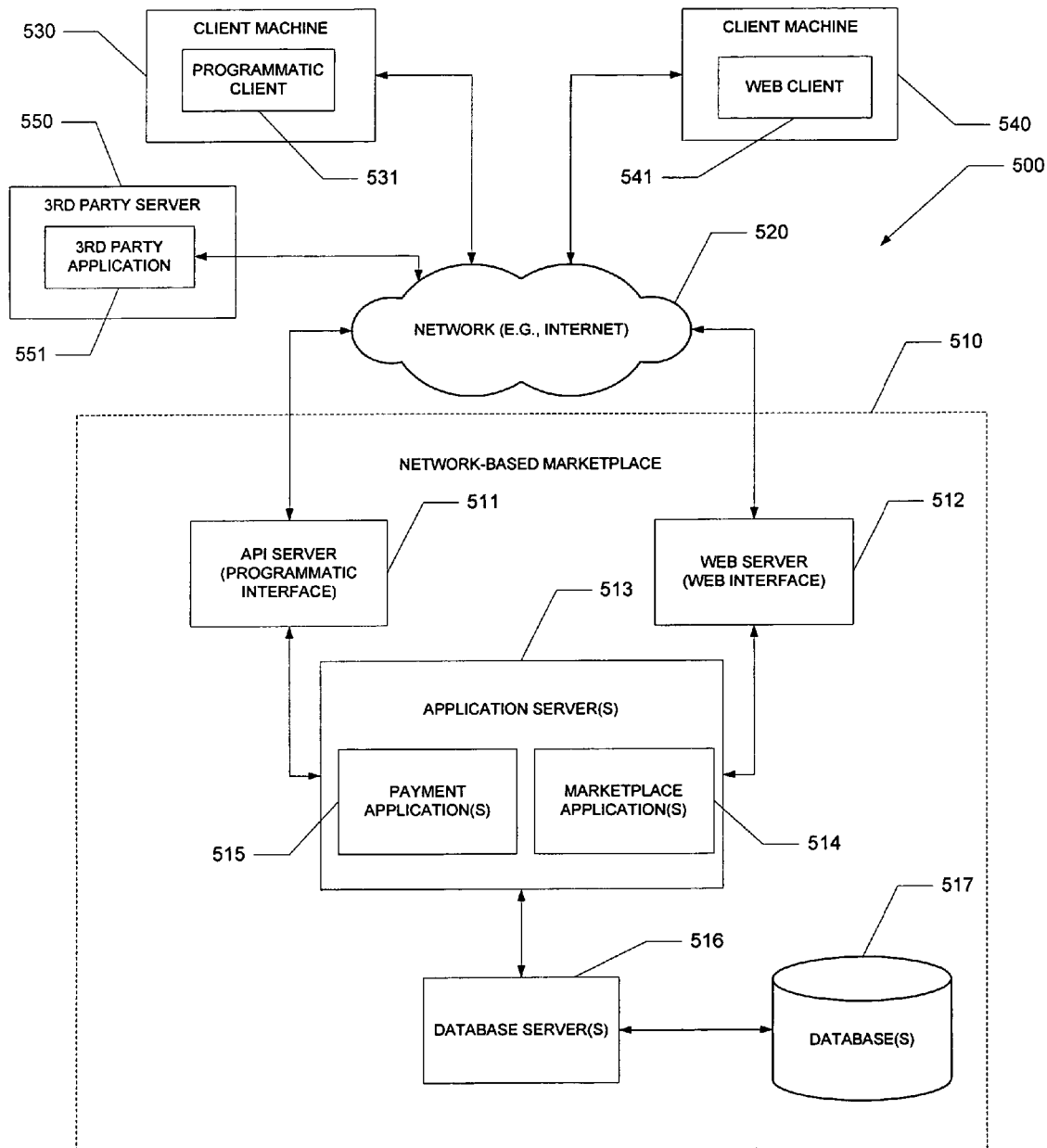
FIG. 5 is a diagram of example network-based commerce system or facility which implements various embodiments associated with the invention.
Figure 6:
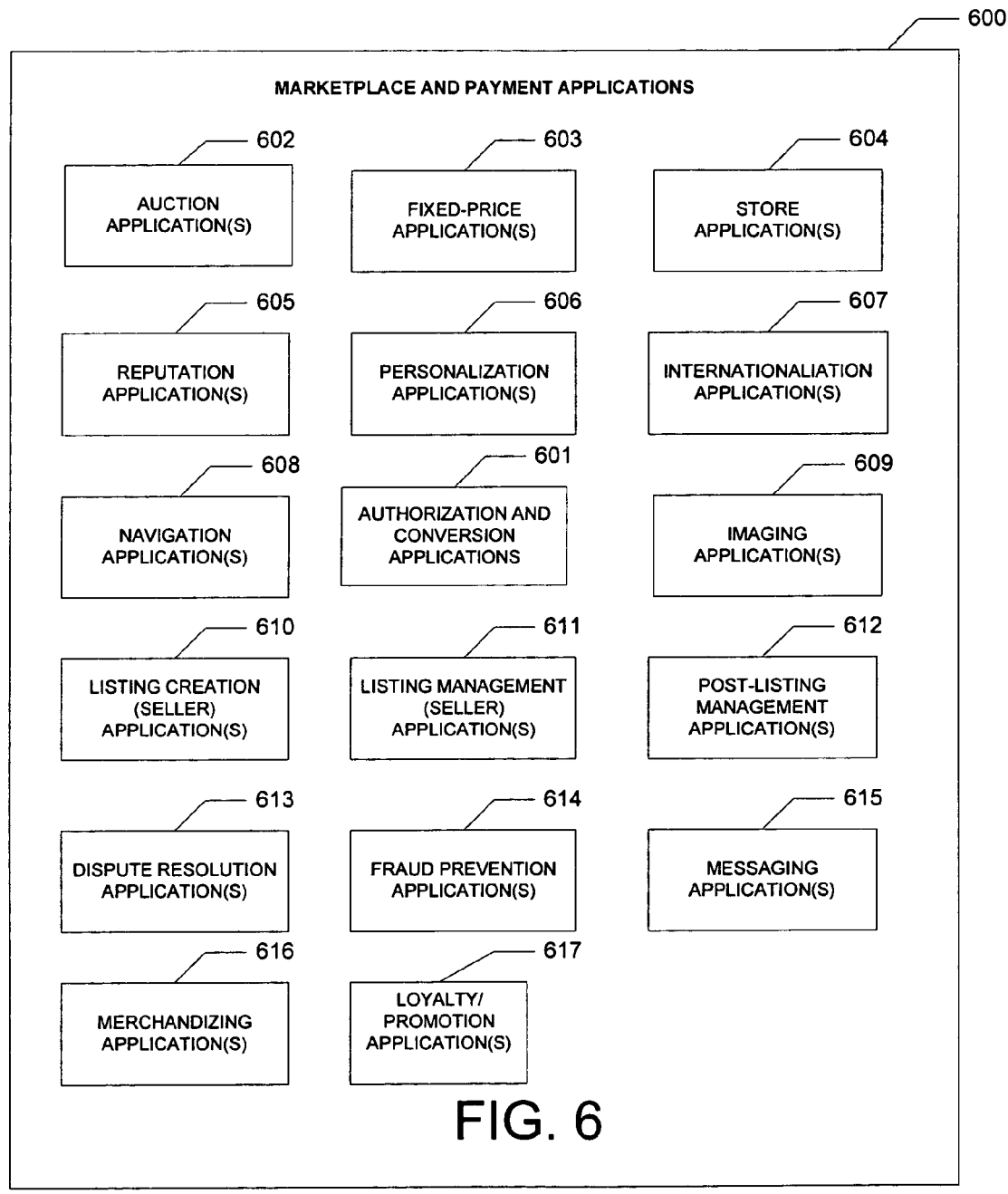
FIG. 6 is a diagram of example applications implemented within some of the components of the network-based commerce system of FIG. 5.
Figure 7:
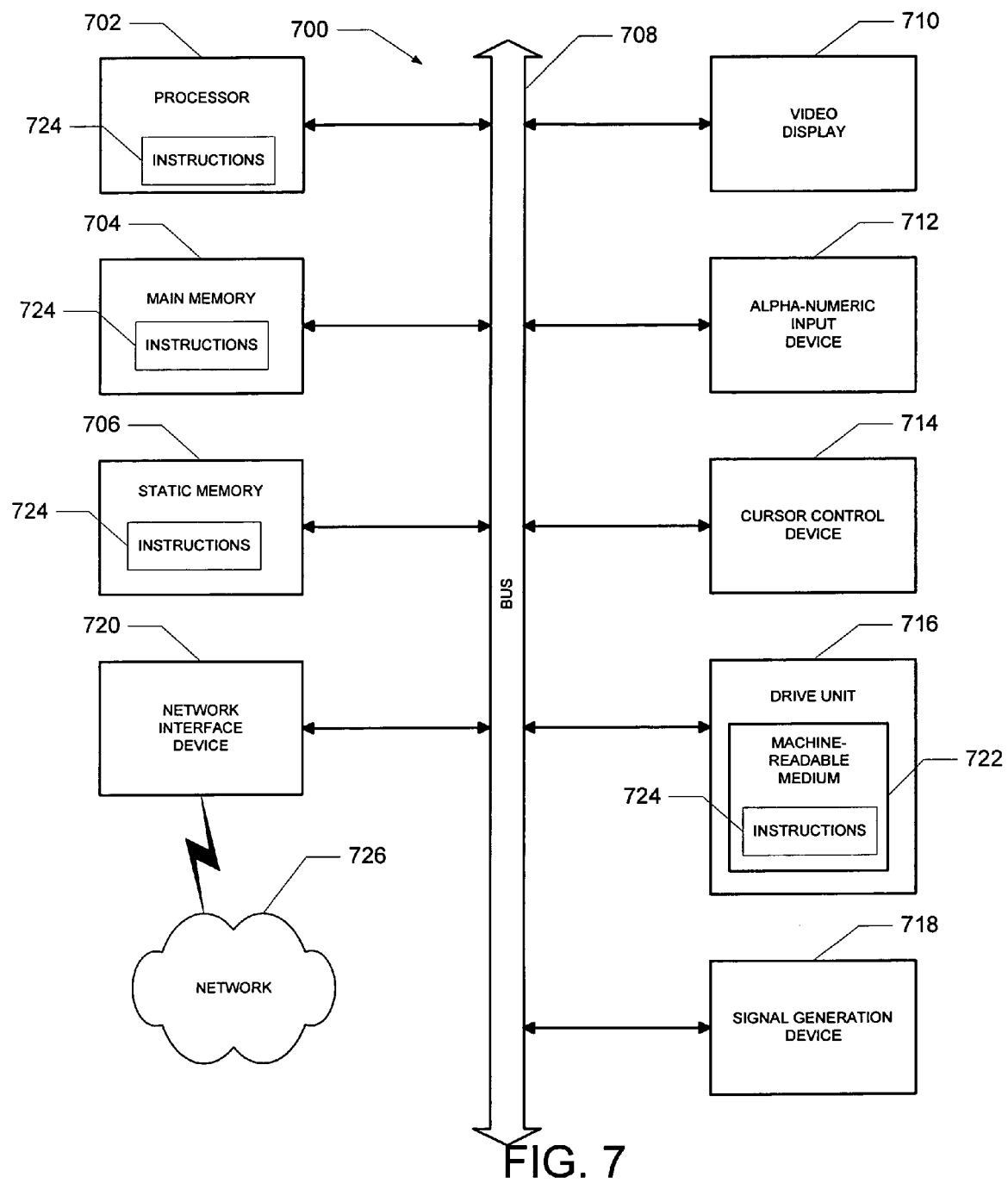
FIG. 7 is a diagram of machine architecture which implements various aspects of the invention, according to an example embodiment.

FIGS. 5-7 are now presented as example implementations of the authorization, conversion, and settlement techniques presented herein. It is understood that these example architectures and arrangements are presented for purposes of illustration only and are not intended to limit other implementations of the teachings presented.

FIG. 5 is a diagram of example network-based commerce system or facility 500 which implements various embodiments associated with the invention. A commerce system 500, in the example form of a network-based marketplace, provides server-side functionality, via a network 520 (e.g., the Internet) to one or more clients.

FIG. 5 illustrates, for example, a web client 541 (e.g., a browser, such as the Internet Explorer browser developed by Microsoft Corporation of Redmond, Wash. State), and a programmatic client 531 executing on respective client machines 540 and 530.

An API server 511 and a web server 512 are coupled to, and provide programmatic and web interfaces respectively to, one or more application servers 513. The application servers 513 host one or more marketplace applications 514 and payment applications 515. The application servers 513 are, in turn, shown to be coupled to one or more databases servers 516 that facilitate access to one or more databases 517.

The marketplace applications 514 provide a number of marketplace functions and services to users that access the commerce system 510. The payment applications 515 likewise provide a number of payment services and functions to users. The payment applications 515 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 514. While the marketplace and payment applications 514 and 515 are shown in FIG. 5 to both form part of the commerce system 510, it will be appreciated that, in alternative embodiments, the payment applications 515 may form part of a payment service that is separate and distinct from the commerce system 510.

Further, while the system 500 shown in FIG. 5 employs a client-server architecture, the present invention is of course not limited to such an architecture, and could equally well find application in a distributed, or peer-to-peer, architecture system for example. The various marketplace and payment applications 514 and 515 could also be implemented as standalone software programs, which do not necessarily have networking capabilities.

The web client 541 accesses the various marketplace and payment applications 514 and 515 via the web interface supported by the web server 512. Similarly, the programmatic client 531 accesses the various services and functions provided by the marketplace and payment applications 514 and 515 via the programmatic interface provided by the API server 511. The programmatic client 531 may, for example, be a seller application (e.g., the TurboLister application developed by eBay Inc., of San Jose, Calif.) to enable sellers to author and manage listings on the commerce system 510 in an off-line manner, and to perform batch-mode communications between the programmatic client 531 and the network-based commerce system 510.

FIG. 5 also illustrates a third party application 551, executing on a third party server machine 550, as having programmatic access to the network-based commerce system 510 via the programmatic interface provided by the API server 511. For example, the third party application 551 may, utilizing information retrieved from the network-based commerce system 510, support one or more features or functions on a website hosted by the third party. The third party website may, for example, provide one or more promotional, marketplace or payment functions that are supported by the relevant applications of the network-based commerce system 510.

FIG. 6 is a diagram of example applications 600 implemented within some of the marketplace applications 514 of the network-based commerce system 510 of FIG. 5. The applications 600 may be hosted on dedicated or shared server machines (not shown) that are communicatively coupled to enable communications between server machines. The architecture of one such example server machine is provided below. The applications themselves are communicatively coupled (e.g., via appropriate interfaces) to each other and to various data sources, so as to allow information to be passed between the applications or so as to allow the applications to share and access common data.

The authorization and conversion applications 601 provide the novel authorization and settlement services described herein. These applications 601 are coupled or interfaced with a variety of other applications in a commerce system 510.

The commerce system 510 may provide a number of listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 600 are shown to include one or more auction applications 602 which support auction-format listing and price setting mechanisms (e.g., English, Dutch, Vickrey, Chinese, Double, Reverse auctions etc.). The various auction applications 602 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 603 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 604 allow sellers to group their listings within a "virtual" store, which may be branded and otherwise personalized by and for the sellers. Such a virtual store may also offer promotions, incentives and features that are specific and personalized to a relevant seller.

Reputation applications 605 allow parties that transact utilizing the network-based commerce system 510 to establish, build, and maintain reputations, which may be made available and published to potential trading partners. Consider that where, for example, the network-based commerce system 510 supports person-to-person trading, users may have no history or other reference information whereby the trustworthiness and credibility of potential trading partners may be assessed. The reputation applications 605 allow a user, for example through feedback provided by other transaction partners, to establish a reputation within the network-based commerce system 510 over time. Other potential trading partners may then reference such a reputation for the purposes of assessing credibility and trustworthiness.

Personalization applications 606 allow users of the commerce system 510 to personalize various aspects of their interactions with the commerce system 510. For example a user may, utilizing an appropriate personalization application 606, create a personalized reference page at which information regarding transactions to which the user is (or has been) a party may be viewed. Further, a personalization application 606 may enable a user to personalize listings and other aspects of their interactions with the commerce system 510 and other parties.

The network-based commerce system 510 may support a number of marketplaces that are customized, for example, for specific geographic regions. A version of the commerce system 510 may be customized for the United Kingdom, whereas another version of the commerce system 510 may be customized for the United States. Each of these versions may operate as an independent marketplace, or may be customized (or internationalized) presentations of a common underlying marketplace. These are represented as the internationalization applications 607 in FIG. 6.

Navigation of the network-based commerce system 510 may be facilitated by one or more navigation applications 608. For example, a search application enables key word searches of listings published via the commerce system 510. A browse application allows users to browse various category, catalogue, or inventory data structures according to which listings may be classified within the commerce system 510. Various other navigation applications may be provided to supplement the search and browsing applications.

In order to make listings, available via the network-based commerce system 510, as visually informing and attractive as possible, the marketplace applications 600 may include one or more imaging applications 609 utilizing which users may upload images for inclusion within listings. An imaging application 609 also operates to incorporate images within viewed listings. The imaging applications 609 may also support one or more promotional features, such as image galleries that are presented to potential buyers. For example, sellers may pay an additional fee to have an image included within a gallery of images for promoted items.

Listing creation applications 610 allow sellers conveniently to author listings pertaining to goods or services that they wish to transact via the commerce system 510 and listing management applications 611 allow sellers to manage such listings. Specifically, where a particular seller has authored and/or published a large number of listings, the management of such listings may present a challenge. The listing management applications 611 provide a number of features (e.g., auto-re-listing, inventory level monitors, etc.) to assist the seller in managing such listings. One or more post-listing management applications 612 also assist sellers with a number of activities that typically occurs post-listing. For example, upon completion of an auction facilitated by one or more auction applications 602, a seller may wish to leave feedback regarding a particular buyer. To this end, a post-listing management application 612 may provide an interface to one or more reputation applications 605, so as to allow the seller conveniently to provide feedback regarding multiple buyers to the reputation applications 605.

Dispute resolution applications 613 provide mechanisms whereby disputes arising between transacting parties may be resolved. For example, the dispute resolution applications 613 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 614 implement fraud detection and prevention mechanisms to reduce the occurrence of fraud within the commerce system 510.

Messaging applications 615 are responsible for the generation and delivery of messages to users of the network-based commerce system 510, such messages for example advising users regarding the status of listings at the commerce system 510 (e.g., providing "outbid" notices to bidders during an auction process or to provide promotional and merchandising information to users).

Merchandising applications 616 support various merchandising functions that are made available to sellers to enable sellers to increase sales via the commerce system 510. The merchandising applications 616 also operate the various merchandising features that may be invoked by sellers, and may monitor and track the success of merchandising strategies employed by sellers.

The network-based commerce system 510 itself, or one or more parties that transact via the commerce system 510, may operate loyalty programs that are supported by one or more loyalty/promotions applications 617. For example, a buyer may earn loyalty or promotions points for each transaction established and/or concluded with a particular seller, and may be offered a reward for which accumulated loyalty points can be redeemed.

FIG. 7 is a diagram of machine architecture 700 which implements various aspects of the invention, according to an example embodiment. The machine includes a set of instructions, which when executed on the machine cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer architecture 700 includes a processor 702 (e.g., a central processing unit (CPU) a graphics processing unit (GPU) or both), a main memory 704 and a static memory 706, which communicate with each other via a bus 708. The architecture 700 may further include a video display unit 710 (e.g., a liquid crystal display (LCD) or a cathode ray tube (CRT)). The architecture 700 also includes an alphanumeric input device 712 (e.g., a keyboard), a cursor control device 814 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the architecture 700, the main memory 704 and the processor 702 also constituting machine-readable media.

The software 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to provide novel authorization, conversion, and settlement or capture have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The above description is illustrative, and not restrictive. Many other embodiments will be apparent to those of ordinary skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

The invention claimed is:

1. An authorization and conversion system comprising:
   at least one processor;
   a memory in communication with at least one processor, storing instructions that when executed by the at least one processor cause the at least one processor to perform the operations of:
      storing at least one settlement policy and at least one mutually agreed threshold for a currency conversion between a buyer and a merchant;
      receiving by a settlement and capture service a transaction from a merchant computer, for an amount in a target currency;
      determining by the settlement and capture service that funds in an account of the buyer in a source currency are insufficient to cover the transaction amount in the target currency;
      based on the settlement policy, acquiring by the settlement and capture service a balance of funds from an account of the buyer in a backup currency, wherein the backup currency is different from the source and target currencies;
      acquiring by the settlement and capture service a currency conversion rate for conversion between the source currency and the backup currency;
      comparing by the settlement and capture service a difference between the acquired currency conversion rate and an initial currency conversion rate with the mutually agreed threshold; and
      authorizing the transaction by the settlement and capture service based on the comparison.

2. The system of claim 1, wherein the account of the buyer in the backup currency includes different available funds in the source currency or in the target currency.

3. The system of claim 2, wherein the settlement and capture service is to convert the funds in the account of the buyer in the source currency to the target currency when the transaction is consummated.

4. The system of claim 3, wherein the settlement and capture service is to determine that the converted funds are deficient to cover the transaction amount in the target currency and acquire additional funds in the target currency from other funding sources when the transaction is consummated based on the determination.

5. The system of claim 3, wherein the authorization and currency conversion system and/or the settlement and capture service assesses a fee to at least one of a buyer or a seller associated with the transaction for authorization and/or for settlement.

6. The system of claim 3, wherein the settlement and capture service is to determine that a proposed conversion will produce a deficiency to cover the transaction amount in the target currency and, based on the determination, abort the transaction and release the transaction amount when the transaction is to be consummated.

7. The system of claim 1, wherein the authorization and currency conversion system is to convert the funds in the account of the buyer in the source currency to the target currency using fixed currency rates available on a day that authorization is processed.

8. The system of claim 1, wherein the settlement and capture service is to convert the funds in the account of the buyer in the source currency to the target currency using currency rates at a time of settlement or capture.

9. The system of claim 8, wherein the settlement and capture service is to determine that the currency rates existing at the time of settlement or capture will produce a settlement amount that exceeds an authorized transaction amount to a certain or predefined percentage of authorization and, based on the determination, abort the transaction.

10. The system of claim 8, wherein the settlement and capture service is to determine that the currency rates existing at the time of settlement will produce a settlement amount that is equal to or less than the authorized transaction amount and, based on the determination, consummate the transaction.

11. The system of claim 8, wherein the settlement and capture service is to determine that the currency rates existing at the time of settlement will produce a settlement amount that exceeds the authorized transaction amount by a percentage of the authorized transaction amount and no additional funding is available to consummate the transaction and, based on the determination, abort the transaction.

12. The system of claim 8, wherein the settlement and capture service is to determine that authorization is insufficient to cover the transaction amount at settlement or capture and the additional funds are converted when necessary to the target currency, and based on the determination, attempt to acquire additional funds from a backup funding source to consummate the transaction.

13. A method comprising:
    storing at least one settlement policy and at least one mutually agreed threshold for a currency conversion between a buyer and a merchant;
    receiving by a settlement and capture service a transaction from a merchant computer, for an amount in a target currency;
    determining by the settlement and capture service that funds in an account of the buyer in a source currency are insufficient to cover the transaction amount in the target currency;
    based on the settlement policy, acquiring by the settlement and capture service a balance of funds from an account of the buyer in a backup currency, wherein the backup currency is different from the source and target currencies;
    acquiring by the settlement and capture service a currency conversion rate for conversion between the source currency and the backup currency;
    comparing by the settlement and capture service a difference between the acquired currency conversion rate and an initial currency conversion rate with the mutually agreed threshold; and
    authorizing the transaction by the settlement and capture service based on the comparison.

14. The method of claim 13 further comprises:
    converting the funds in the account of the buyer in the source currency to the target currency when the transaction is consummated.

15. The method of claim 13 further comprises:
    determining that the balance of funds from the account of the buyer in the backup currency is sufficient to cover the transaction amount in the target currency and, based on the determination, deciding to proceed with a settlement.

16. The method of claim 13 further comprises:
    determining that the currency conversion rates used with the target currency at the time of the settlement creates a deficiency in the funds authorized and, based on the determination, denying a settlement.

17. The method of claim 13 further comprises:
presenting estimated funds that are to be used to settle the transaction to the buyer via a buyer's interface before authorization.

18. The method of claim 17, wherein presenting further comprises:
presenting a current conversion rate associated with determining the estimated funds.

19. The method of claim 13, further comprising:
interacting with the buyer via a buyer's interface to acquire identities for the account of the buyer in the source currency;
determining that funds in the account of the buyer in the source currency is deficient at the settlement due to then-existing currency conversion rates, and
acquiring a backup credit card funding source from the buyer via the buyer's interface to cover the transaction at a settlement, based on the determination.

20. The method of claim 13, further comprising:
asking the buyer whether a bank associated with a credit card is to be used as a backup funding source to convert to the target currency at settlement or whether a third-party conversion systems to be used to convert to the target currency at a settlement.

21. The method of claim 20, further comprising at least one of:
denying settlement when converting would produce a discrepancy;
using the account of the buyer in the backup currency to cover additional amounts when the transaction is more expensive in response to the conversion of the funds in the account of the buyer in the source currency; and
proceeding with the transaction at settlement when the conversion of the funds in the account of the buyer in the source currency is within a tolerance.

22. The method of claim 20, further comprising:
modifying a settlement amount at a settlement time when a present conversion rate between the target currency and the source currency produces a discrepancy in favor of the buyer.

23. A machine readable medium embodying instructions that, when executed by a machine, cause the machine to perform the following operations:
storing at least one settlement policy and at least one mutually agreed threshold for a currency conversion between a buyer and a merchant;
receiving by a settlement and capture service a transaction from a merchant computer, for an amount in a target currency;
determining by the settlement and capture service that funds in an account of the buyer in a source currency are insufficient to cover the transaction amount in the target currency;
based on the settlement policy, acquiring by the settlement and capture service a balance of funds from an account of the buyer in a backup currency, wherein the backup currency is different from the source and target currencies;
acquiring by the settlement and capture service a currency conversion rate for conversion between the source currency and the backup currency;
comparing by the settlement and capture service a difference between the acquired currency conversion rate and an initial currency conversion rate with the mutually agreed threshold; and
authorizing the transaction by the settlement and capture service based on the comparison.

* * * * *

UNITED STATES PATENT AND TRADEMARK OFFICE
CERTIFICATE OF CORRECTION

PATENT NO. : 7,734,544 B2
APPLICATION NO. : 11/376848
DATED : June 8, 2010
INVENTOR(S) : Joerg Schleicher It is certified that error appears in the above-identified patent and that said Letters Patent is hereby corrected as shown below:

In Drawings
On Sheet 3 of 7, in Figure 3, Reference Numeral 343, line 3, delete "SETTMENT" and insert -- SETTLEMENT --, therefor.

On Sheet 6 of 7, in Figure 6, Reference Numeral 607, line 1, delete "INTERNATIONALIATION" and insert -- INTERNATIONALIZATION --, therefor.

In column 7, line 29, delete "211." and insert -- 212. --, therefor.

In column 7, line 38, delete "(herein after" and insert -- (hereinafter --, therefor.

In column 8, line 64, delete "finds" and insert -- funds --, therefor.

In column 9, line 12, delete "finds" and insert -- funds --, therefor.

In column 9, line 25, delete "finding" and insert -- funding --, therefor.

In column 9, line 28, delete "finding" and insert -- funding --, therefor.

In column 14, line 11, delete "814" and insert -- 714 --, therefor.

Signed and Sealed this

Twentieth Day of July, 2010

David J. Kappos
*Director of the United States Patent and Trademark Office*